United States Patent Office 2,971,981
Patented Feb. 14, 1961

2,971,981
PREPARATION OF ALPHA-HYDROXYISO-BUTYRIC ACID

Robert S. Aries, New York, N.Y.
(225 Greenwich Ave., Stamford, Conn.)

No Drawing. Filed May 10, 1957, Ser. No. 658,216

1 Claim. (Cl. 260—533)

The present invention relates to a novel process for the direct oxidation of isobutylene to alpha-hydroxyisobutyric acid. While alpha-hydroxyisobutyric acid is a valuable and useful product in itself, through dehydration it is a key intermediate in the production of methacrylic acid and methacrylate esters such as methyl methacrylate, ethyl methacrylate, butyl methacrylate, lauryl methacrylate, myristyl methacrylate, cetyl-stearyl methacrylate and many other methacrylate esters useful in the arts and industries.

Methacrylic acid and its esters are usually prepared by the oxidation of methacrolein, the hydrolysis of acetone cyanohydrin, the oxidation of methyl-alpha-alkyl vinyl ketone with metal hypochlorites, or the dehydration of alpha-hydroxy-isobutyric acid. The use of cheap readily available isobutylene as the primary raw material permits obtaining alpha-hydroxyisobutyric acid more economically than by any existing method of production, and from it the various methacrylates including both the acid and also its esters.

The ultimate raw material for the novel process of the present invention is isobutylene. It may be used as isobutylene of relatively high purity or as isobutylene mixed with butanes as ordinarily obtained. The butanes are unaffected by the oxidation means used. Isobutylene in any of its forms, pure or admixed with butanes, is an extremely cheap raw material available in practically unlimited amounts.

The oxidation of the isobutylene is effected according to my invention by means of nitrogen dioxide ($NO_2$), either alone or in admixture with nitric acid. The reaction is not represented by a simple stoichiometric equation since $NO_2$ in acting as the oxidant is, of course, itself reduced, principally to NO which is easily recoverable for reconversion to $NO_2$, but also in lesser amounts the $NO_2$ is reduced to $N_2O$ and $N_2$ which are not regenerated to $NO_2$ in the recovery process.

Assuming that the effective reaction is the reaction occurring to the greatest extent it may be represented as

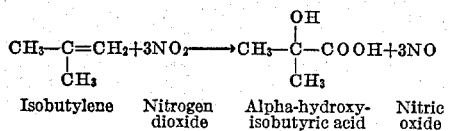

| Isobutylene | Nitrogen dioxide | Alpha-hydroxy-isobutyric acid | Nitric oxide |

Although this equation indicates that each mol of isobutylene to be converted required 3 mols of $NO_2$ for its oxidation, I have found that best results are obtained by the use of approximately 4 mols of oxidant, as a small amount of the isobutylene is converted to carbon oxides and also a small amount to acetic acid and to acetone, with a greater consumption of nitrogen dioxide. To obtain the maximum and optimum yield of alpha-hydroxyisobutyric acid about 4 mols of $NO_2$ or 4 mols total of $NO_2$ and nitric acid are required. Larger molar ratios than 4 mols of $NO_2$ per mol of isobutylene are harmless but unnecessary and wasteful as the products produced are not further acted upon by the excess of $NO_2$; smaller amounts of $NO_2$ than the ratio of 4 mols of $NO_2$ per mol of isobutylene may also be used, but if the ratio is distinctly less than 4 there will remain some unreacted isobutylene which may be recovered; if a mixture of isobutylene and butane is used as the raw material for oxidation the by-product butane recovered will contain the unreacted isobutylene.

The reaction is best carried out at temperatures of 0° to 5° C. Increasing the temperature above 5° C. increases the amount of by-products and in general it may be stated that the upper limit for economical operation is about 20° C. Below 0° C. the reactivity as expressed by the rate of reaction decreases to a less desirable lower figure. Thus the temperature range for optimum conversion is 0–5° C., although temperatures below 0° C. and up to 20° C. may be used.

The pressure in the reacting system may be varied within a wide range, but as the rate of reaction is sufficiently rapid to be commercially practical at approximately atmospheric pressure there is no appreciable economic advantage in using lower or higher pressures which require more careful operational control and added equipment. The use of higher pressures does increase the rate of reaction but renders the control of the desired reaction temperature more difficult.

The reaction can be carried out without a catalyst but proceeds somewhat more rapidly in the presence of the usual metal oxidation catalysts such as compounds of V, Cu, Co and Mn, or mixtures of these. The amounts of catalyst found useful to accelerate the oxidation are within the range of 0.0005 to 0.1 mol of catalyst per mol of isobutylene. Larger amounts do not additionally increase the rate of oxidation and provide no advantage.

In view of the relatively small effect of the catalyst on the rate of oxidation I have generally preferred to carry out the oxidation without a catalyst.

The immediate product of the oxidation reaction is a mixture of alpha-hydroxyisobutyric acid and alpha-nitratoisobutyric acid. The latter need not be separated as such because the refining steps used to recover the pure-alpha-hydroxyisobutyric acid convert all the alpha-nitratoisobutyric acid in the mixture to alpha-hydroxyisobutyric acid.

At the end of the oxidation reaction the total product is subjected to vacuum distillation at room temperature, that is to say, at 10° C. to 25° C. to remove unreacted and dissolved nitrogen oxides. Air may be bled in to help remove the dissolved gases. The degassed product is then diluted with dilute nitric acid (5% to 20% $HNO_3$) so that the mixture contains about 50 mol percent of organic material. This mixture is then held at about 30° C. for 0.5 to 3.0 hours during which time the alpha-nitratoisobutyric acid is hydrolyzed completely to alpha-hydroxyisobutyric acid. The alpha-hydroxyisobutyric acid is then recovered from solution by crystallization and filtration, by neutralization and crystallization as a salt, or by esterification and distillation of the ester.

The overall yield of the oxidation and recovery is 80–86 percent on the isobutylene. About 2 to 3% of the carbon content of the isobutylene is converted to carbon oxides and the remainder of the amount of isobutylene consumed but not converted to alpha-hydroxyisobutyric acid appears as by-product acetic acid and acetone, in the mol ratio of acetic acid to acetone of about 2:1. Although in the examples the recovery of acetic acid and acetone is not indicated, these products may be recovered by well known methods.

About 10% of the $NO_2$ and $HNO_3$ used as the oxidizing agent is reduced to $N_2$ and $N_2O$. The remainder 90%, is reduced to NO which can be reconverted to $NO_2$ by well known methods of oxidation by air, and thus can be made available for recycling in the process. In effect, the entire process thus becomes equivalent to direct air oxidation except for the 10% of nitrogen dioxide and nitric acid converted to nitrogen and nitrous oxide. I have carried out the oxidation as described above with the addition of air to the reaction mixture so that the nitric oxide, NO, formed is re-oxidized by the air added within the reactor and have found that the amount of nitrogen dioxide and nitric acid can be reduced effectively below the mol ratio of 4 found to be optimum in the absence of air, but the use of merely catalytic amounts of nitrogen dioxide with excess of air has not proved successful. This is probably due to the effect of the nitrogen content of the air which sweeps out a mixture of NO and $NO_2$ from the reaction system before it has had a chance to act on the isobutylene still present. In the absence of air the amount of gases to be vented from the system is small and this small amount of gas, chiefly NO, does not carry with it any appreciable amount of unreacted $NO_2$. This sweeping out action of air or of nitrogen from air can be overcome to some extent by allowing the pressure to build up, but even at 3 atmospheres total pressure it was not possible to use only catalytic amounts of nitrogen dioxide in combination with excess air to carry out the oxidation.

I have also used pure oxygen instead of air and here again although the amount of nitrogen dioxide required is less than the 4 mol ratio it has not proved possible to carry out the reaction completely using only catalytic amounts of nitrogen dioxide with excess oxygen.

The reaction may be carried out batchwise by bubbling isobutylene through $NO_2$ or through a mixture of $NO_2$ and $HNO_3$. The reaction may also be carried out continuously in a stirred reactor (autoclave) by adding isobutylene and nitrogen dioxide as continuous streams and drawing off a continuous stream of liquid product while maintaining a constant liquid level in the reactor. The reaction may also be carried out in a continuous manner in a tubular reactor which provides appropriate residence time.

I have found that in bubbling isobutylene into a glass flask containing liquid nitrogen dioxide the isobutylene is absorbed when it has travelled only about one inch into the liquid phase.

In a continuous tubular or stirred autoclave reactor the time necessary for complete absorption is less than 10 seconds.

Although it is not a part of my invention I shall describe briefly the production of the methacrylates which at present are the principal products commercially obtainable from alpha-hydroxyisobutyric acid. The acid or any of its esters prepared in the usual manner, as, for instance by the action of an appropriate alcohol on the alpha-hydroxyisobutyric acid or its esters is dehydrated by means of phosphorus pentoxide, sulfuric acid or activated alumina.

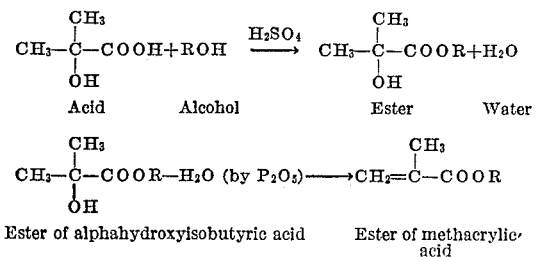

Example 1

In a 500 ml. glass flask containing 184 grams (about 135 ml.) of liquid $NO_2$ maintained at 0° C. Internal temperature set in a bath of salt and ice, isobutylene was passed (after passing through a spiral glass tube set in an ice bath to cool it to about 0° C.) until bubbles of gas began to pass through the liquid without being absorbed. The effluent gases were passed into a large volume of water to absorb the NO formed, and the scrubbed gas from the water absorber was analyzed for unconverted isobutylene. The 184 grams of $NO_2$ absorbed 57 grams of isobutylene, which is approximately in a mol ratio of 4:1. After the reaction was complete, the flask was connected to a vacuum system and a small amount of air was bled in through a capillary while the contents were warmed to 25° C. by a water bath for 10 minutes. The liquid charge was then poured into 50 ml. of 5% nitric acid and held at 30° C. for 3 hours while a slow stream of air was sparged into the solution. This serves to hydrolyze any alpha-nitratoisobutyric acid present to alpha-hydroxyisobutyric acid.

The nitric acid solution was then held at 0° C. overnight in the refrigerator and quickly filtered through a small chilled Büchner funnel. The solid was spread on a watch glass and dried in a vacuum dissicator over sulfuric acid at room temperature for two days. The weight of the dry acid was 47.6 grams, or 85% on the isobutylene absorbed. The acid had a melting point of 72–74° C. and could easily be sublimed. The methyl ester was prepared and found to be identical with the methyl ester prepared from authentic alpha-hydroxyisobutyric acid.

Example 2

This was run similarly to Example 1 except that as the oxidizing agent 138 grams of liquid $NO_2$ and 90 grams of 70% $HN_3$ were used as the liquid medium through which the isobutylene was bubbled. Otherwise all other conditions were as in Example 1. The amount of isobutylene absorbed was 58 grams. The recovered alpha-hydroxyisobutyric acid was 45.5 grams, or over 78% on the isobutylene absorbed.

Example 3

This was run similarly to Example 1 except that the hydrocarbon feed used was a mixture of isobutylene and butanes containing 50% of isobutylene. The olefin gas was passed into the liquid $NO_2$ until no further reaction occurred. The yield of alpha-hydroxyisobutyric acid was 46.9 grams.

Example 4

This was run similarly to Example 2 except that the hydrocarbon feed used was a mixture of isobutylene and butanes containing 50% of isobutylene. The olefin gas was passed into the $NO_2$–70% $HNO_3$ mixture until no further reaction seemed to occur. The yield of alpha-hydroxyisobutyric acid was 44.1 grams.

Example 5

A stirred stainless steel jacketed autoclave of ½ liter capacity was used as the reactor. The autoclave had a vent tube to lead gases by a long stainless steel tube to the outside air. No appreciable internal pressure was generated. The internal temperature in the reactor was held at 0°–5° C. by running ice-water through the jacket. The autoclave was charged with 300 ml. of liquid nitrogen dioxide which had been precooled to 0° C. Then isobutylene, precooled to 0° C., was added through a stainless steel feed tube opening through a perforated head below the liquid level with agitation until 138 grams had been added. Then liquid $NO_2$ at 0° C. was added at the rate of 10 grams per minute and isobutylene cooled to 0° C. was added at the rate of 3.1–3.2 grams per minute as uniformly as possible, and liquid was withdrawn through the bottom outlet valve at the rate of 4 grams per minute. After an hour's run with the concurrent addition of $NO_2$ and isobutylene, the reaction was stopped. The autoclave was found to contain about 125 grams of liquid. The total liquid, that withdrawn continuously and that remaining in the reactor was 360 grams. This was freed from dissolved gases by low temperature vacuum distillation with the aid of a capillary stream of air as in Example 1 and then treated with dilute nitric acid as in the other examples and the alpha-hydroxyisobutyric acid recovered from a one-tenth aliquot was 22.4 grams, equivalent to 224 grams for the whole charge of about 328 grams of isobutylene or 68%.

Example 6

The reactor used was a coil of stainless steel, 30 feet in length and ¼ inch internal diameter which was set in a large bath of crushed ice and water. $NO_2$ which was precooled to 0° C. was fed into the inlet end of the stainless steel coil at the rate of 2 grams per minute. Pure isobutylene precooled to 0° C. was forced in through a side arm into the same coil at the rate of 0.65 gram per minute. The exit end of the coil was connected to a 500 ml. flask which was set in an ice-water mixture. Beyond the flask was a trap to prevent liquid carry-over by effluent gases. The vapor space in the flask remained almost colorless with a very slight brown tinge indicating that reaction (reduction of $NO_2$) was substantially complete. The exit tube was led outside of the laboratory space into the outside air and the vented gases formed a reddish brown cloud indicating the presence of NO in the vented gas. At the end of 3 hours the flask was less than half full. The flask was removed from the ice-bath, allowed to reach room temperature, 72° F., and was subjected to vacuum while a slight amount of air was bled in through a capillary. 200 ml. of 5% $HNO_3$ was added and the mixture was allowed to stand for 3 hours in the flask set in a water bath at 90° F. with occasional swirling. The flask was then set in a refrigerator at 0° C. overnight and filtered rapidly through a small chilled Büchner funnel and sucked dry. The solid on the filter was then treated as in the other examples and the yield was 91.4 grams of alpha-hydroxyisobutyric acid.

Example 7

This was run similarly to Example 1 except that a current of dry air precooled to 0° C. was also run into the flask at the rate of 250 ml. per minute. The scrubbed gas from the water absorber was analyzed for isobutylene, and when the amount passing through the system without reacting increased substantially the reaction was stopped. The 184 grams of $NO_2$ absorbed 68 grams of isobutylene, indicating that air causes some reconversion of NO to $NO_2$. The ratio of initial $NO_2$ used to isobutylene absorbed was thus reduced from the mol ratio of approximately 4:1 in Example 1 to 3.35:1 in the present example.

The foregoing examples are merely illustrative of my invention and obvious modifications can be made without departing from my invention. It is intended that such modifications be embraced by the annexed claim.

I claim:

In the process for the preparation of alpha-hydroxyisobutyric acid which comprises contacting gaseous isobutylene with at least 4 moles of nitrogen dioxide per mole of isobutylene at a temperature between about 0° and 20° C., and removing unreacted nitrogen oxides by vacuum distillation, the improvement which comprises thereafter adding to the reaction mixture nitric acid having a concentration between about 5% and 20% until the reaction mixture contains about 50% of organic material, maintaining the mixture at about 30° C. for about ½ to 3 hours to hydrolyze any alpha-nitratoisobutyric acid present, and recovering the alpha-hydroxyisobutyric acid.

References Cited in the file of this patent

UNITED STATES PATENTS

| | | |
|---|---|---|
| 2,402,315 | Crowder | June 18, 1946 |
| 2,776,190 | Mantell et al. | Jan. 1, 1957 |
| 2,847,453 | Gardner et al. | Aug. 12, 1958 |
| 2,847,465 | Robertson et al. | Aug. 12, 1958 |

OTHER REFERENCES

Haitinger: Ann. Chem., vol. 193 (1878), pages 376–83.

Ephraim: Inorganic Chemistry, 4th edition (1943), pages 672–3.

Levy et al.: J. Chem. Soc. (London), 1948, pages 52–59.

Klemenc: Chem. Ab., vol. 42 (1948), pages 6221–2.